United States Patent
Ji et al.

(10) Patent No.: US 10,641,404 B2
(45) Date of Patent: May 5, 2020

(54) SPRING SEAT FOR AN INTERNAL VALVE

(71) Applicant: EMERSON PROCESS MANAGEMENT REGULATOR TECHNOLOGIES, INC., McKinney, TX (US)

(72) Inventors: FeiFei Ji, Shanghai (CN); Li Li, Shanghai (CN); Jing Chen, Shanghai (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 147 days.

(21) Appl. No.: 15/635,708

(22) Filed: Jun. 28, 2017

(65) Prior Publication Data
US 2018/0259078 A1   Sep. 13, 2018

(30) Foreign Application Priority Data

Mar. 10, 2017 (CN) .......................... 2017 1 0149039
Mar. 10, 2017 (CN) ...................... 2017 2 0236947 U

(51) Int. Cl.
*F16K 17/04* (2006.01)
*F16K 17/30* (2006.01)
(Continued)

(52) U.S. Cl.
CPC ............ *F16K 17/04* (2013.01); *F16K 17/048* (2013.01); *F16K 17/30* (2013.01); *F16K 31/52408* (2013.01); *F16K 39/024* (2013.01)

(58) Field of Classification Search
CPC ........ F16K 17/04; F16K 17/048; F16K 17/30; F16K 31/1221; F16K 31/52408; F16K 39/024
See application file for complete search history.

(56) References Cited

U.S. PATENT DOCUMENTS 1,652,510 A * 12/1927 Allen ................... F16K 27/02
                                                                   251/144
2,226,843 A    12/1940 Carlson
(Continued)

FOREIGN PATENT DOCUMENTS

EP    2 334 965 B1   10/2015
JP    S48-73321 U     9/1973

OTHER PUBLICATIONS

International Search Report and Written Opinion for Application No. PCT/US2018/018925, dated Jun. 7, 2018.

(Continued)

*Primary Examiner* — William M McCalister
(74) *Attorney, Agent, or Firm* — Marshall, Gerstein & Borun LLP

(57) ABSTRACT

An internal valve includes a valve body, a valve stem, a poppet valve, and a bleed valve. The bleed valve includes a body with a bore. A spring seat fits within the bore and is coupled to the valve stem, and includes a guide sized to receive the valve stem and a flow aperture. The flow aperture defines a connecting bleed path that fluidly connects a bleed flow path and a bleed outlet. The valve stem shifts from a first position where the poppet valve and the bleed valve are closed, to a second position where the bleed valve is open and the poppet valve is closed, and a third position where the poppet valve is open and the bleed valve is closed. A spring disposed in the bore bears against the spring seat and is arranged to close the poppet valve and open the bleed valve.

25 Claims, 10 Drawing Sheets

(51) Int. Cl.
*F16K 31/524* (2006.01)
*F16K 39/02* (2006.01)

(56) References Cited

U.S. PATENT DOCUMENTS

| | | | | |
|---|---|---|---|---|
| 2,258,230 | A * | 10/1941 | Warren | F16K 1/32 |
| | | | | 137/242 |
| 2,347,158 | A | 4/1944 | Spraragen | |
| 2,526,346 | A | 10/1950 | Goldinger | |
| 2,630,137 | A * | 3/1953 | Krone | F16K 17/30 |
| | | | | 137/413 |
| 2,904,074 | A * | 9/1959 | Towler | B30B 15/186 |
| | | | | 137/614.17 |
| 2,926,690 | A | 3/1960 | Martin | |
| 3,078,875 | A * | 2/1963 | Farrell | F16K 27/02 |
| | | | | 137/270 |
| 3,144,003 | A * | 8/1964 | Jacobs | A01K 7/06 |
| | | | | 119/75 |
| 3,164,359 | A * | 1/1965 | Dyer | B60T 11/103 |
| | | | | 251/38 |
| 3,199,534 | A * | 8/1965 | Shaw | F16K 27/07 |
| | | | | 137/565.13 |
| 3,285,288 | A * | 11/1966 | Irwin | F16K 27/07 |
| | | | | 137/630.15 |
| 3,599,931 | A * | 8/1971 | Hanson | F16K 31/1221 |
| | | | | 251/144 |
| 3,631,893 | A * | 1/1972 | Seaman | F16K 17/168 |
| | | | | 137/517 |
| 3,631,894 | A * | 1/1972 | Frantz | F02N 7/08 |
| | | | | 137/630.15 |
| 3,844,312 | A * | 10/1974 | Sumner | F16K 17/30 |
| | | | | 137/460 |
| 5,848,608 | A * | 12/1998 | Ishigaki | F16K 31/1225 |
| | | | | 137/599.16 |
| 8,256,462 | B2 * | 9/2012 | Lin | F16K 1/385 |
| | | | | 137/630 |
| 8,262,057 | B2 | 9/2012 | Lin et al. | |
| 8,353,310 | B2 * | 1/2013 | Lin | F16K 1/126 |
| | | | | 137/221 |
| 8,517,046 | B2 * | 8/2013 | Lin | F16K 1/385 |
| | | | | 137/329.02 |
| 9,476,518 | B2 | 10/2016 | Blanchard et al. | |
| 2006/0266962 | A1 * | 11/2006 | Kanzaka | F16K 1/48 |
| | | | | 251/63.6 |
| 2008/0308161 | A1 * | 12/2008 | Lin | F16K 27/07 |
| | | | | 137/511 |
| 2010/0084594 | A1 | 4/2010 | Lin et al. | |
| 2011/0203685 | A1 | 8/2011 | Lin et al. | |
| 2013/0056666 | A1 | 3/2013 | Lin et al. | |
| 2015/0129791 | A1 | 5/2015 | Okita et al. | |

OTHER PUBLICATIONS

International Search Report and Written Opinion for Application No. PCT/US2018/018933, dated Jun. 7, 2018.
International Search Report and Written Opinion for Application No. PCT/US2018/018940, dated Jun. 5, 2018.
International Search Report and Written Opinion for Application No. PCT/US2018/019157, dated Jun. 8, 2018.
International Search Report and Written Opinion for Application No. PCT/US2018/019162, dated Jun. 5, 2018.
Emerson Process Management, Types C471 and C477 Jet Bleed Internal $^{TM}$ Valves, Bulletin LP-7:C471/C477, 8 pages, Sep. 2012, United States.
Emerson Process Management, Types C471, C477 and C486 Internal Valves; Types C471, C477 and C486, 16 pages, Oct. 2015, United States.
U.S. Office Action for U.S. Appl. No. 15/636,492, dated Apr. 24, 2019.
U.S. Office Action for U.S. Appl. No. 15/636,492, dated Jan. 3, 2019.
U.S. Office Action for U.S. Appl. No. 15/635,904, dated Feb. 21, 2019.
U.S. Office Action for U.S. Appl. No. 15/636,507, dated Dec. 28, 2018.
U.S. Office Action for U.S. Appl. No. 15/636,507, dated Jan. 24, 2019.
U.S. Office Action for U.S. Appl. No. 15/635,914, dated Sep. 10, 2018.
U.S. Office Action for U.S. Appl. No. 15/636,492, dated Sep. 6, 2018.
U.S. Office Action for U.S. Appl. No. 15/636,492, dated Feb. 23, 2018.
U.S. Office Action for U.S. Appl. No. 15/635,914, dated Feb. 23, 2018.
U.S. Office Action for U.S. Appl. No. 15/636,507, dated Sep. 7, 2018.
U.S. Office Action for U.S. Appl. No. 15/636,507, dated Feb. 23, 2018.

* cited by examiner

A-A

B-B

C-C

D-D

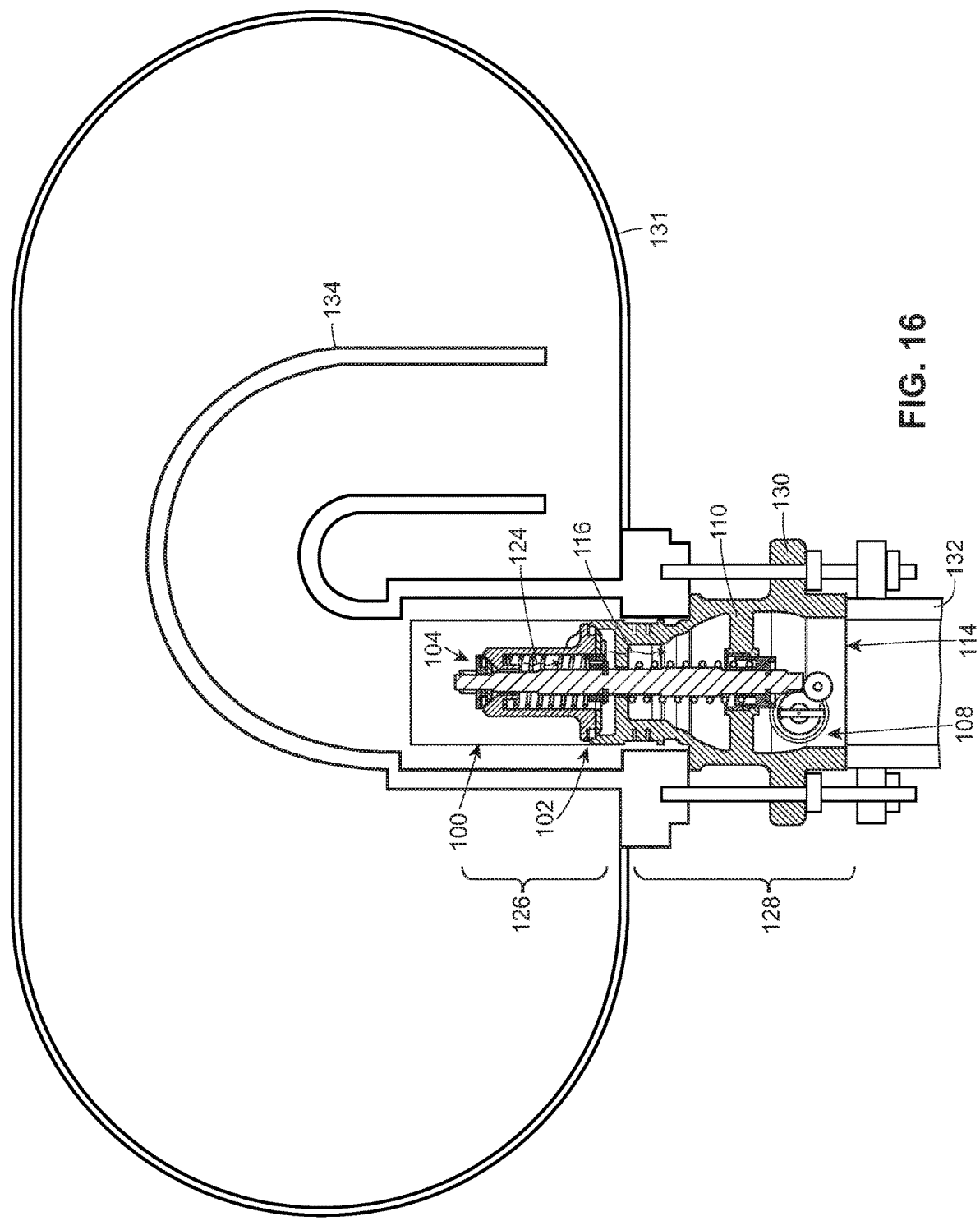

SPRING SEAT FOR AN INTERNAL VALVE

FIELD OF THE INVENTION

The present disclosure generally relates to an internal valve, and more specifically to a spring seat disposed within an internal valve.

BACKGROUND

Internal valves are used for a variety of commercial and industrial applications to control fluid flow between a fluid storage container and another container, hose, pipeline, etc. In particular, internal valves may protect against discharge of hazardous materials, compressed liquids, and gases such as, for example, propane, butane, and $NH_3$ (anhydrous ammonia), when transferring such material between a first location and a second location. Internal valves employ flow control mechanisms that close in response to a sudden excess flow condition due to, for example, a broken, severed, or otherwise compromised flow path. Such flow control mechanisms are commonly referred to as poppet valves or excess flow valves, which are often used in applications requiring an automatic, safe cutoff of fluid flow in response to potential leaks or spills of potentially dangerous fluids.

The poppet valve typically operates based on a pressure differential across the internal valve. For example, the poppet valve opens when the inlet pressure is approximately equal to the outlet pressure. The internal valve will typically employ a bleed valve to equalize or balance the pressure across the flow control member before opening the main valve. In one example, an internal valve may be used on an inlet or an outlet of a large storage tank and keeps the tank from rupturing from excessive internal tank pressure. The bleed valve allows the tank to vent or bleed the pressurized gas through a bleed flow path and eventually through the poppet valve until the tank pressure drops to an acceptable level before fully opening the valve.

SUMMARY

In accordance with a first exemplary aspect, an internal valve assembly for connection to a fluid container may include a valve body having an inlet, an outlet, and defining a main flow path between the inlet and the outlet. A poppet valve may be coupled to the valve body and shiftable between an open position where the inlet of the valve body is open, and a closed position where the inlet of the valve body is closed. A bleed valve may include a bleed valve body having a bore, a bleed inlet, a bleed outlet, and defining a bleed flow path between the bleed inlet and the bleed outlet. The bleed valve may be arranged to open and close the bleed inlet. A valve stem may be slidably disposed in the valve body and operatively coupled to the bleed valve. An actuator may be operatively coupled to the valve stem and operable to shift the valve stem from a first position in which the poppet valve and the bleed valve are both closed, to a second position in which the bleed valve is open, and a third position in which the bleed valve is closed and the poppet valve is open. When the valve stem is in the third position, the poppet valve may be arranged to shift toward the closed position and the bleed valve may be arranged to open in response to a pressure change. A spring may be disposed in the bore and may be positioned to bias the poppet valve between the open position and the closed position to respond to fluid pressure changes. A spring seat sized to fit within the bore may be coupled to the valve stem. The spring seat may include a guide sized to receive the valve stem, and may define at least a portion of a flow aperture. The flow aperture may be disposed in the bleed flow path and may permit fluid communication between the bleed inlet and the bleed outlet.

In accordance with a second exemplary aspect, an internal valve for equalizing a pressure differential may include a valve body having an inlet, an outlet, and defining a main flow path between the inlet and the outlet. A poppet valve may be arranged to open and close the inlet of the valve body. A bleed valve may include a bleed valve body having a bore, a bleed inlet, a bleed outlet, and defining a bleed flow path between the bleed inlet and the bleed outlet. The bleed valve may be arranged to open and close the bleed inlet. A valve stem may be slidably disposed in the valve body and operatively coupled to the bleed valve. The valve stem may be shiftable from a first position in which the poppet valve and the bleed valve are both closed, to a second position in which the bleed valve is open and the poppet valve is closed, and a third position in which the poppet valve is open and the bleed valve is closed. A spring may be disposed in the bore and positioned to bias the poppet valve between the open position and the closed position to respond to fluid pressure changes. The spring may be arranged to shift the poppet valve toward the closed position and open the bleed valve while the valve stem is in the third position. A spring seat sized to fit within the bore may be coupled to the valve stem. The spring seat may include a guide sized to receive the valve stem. The spring seat may define at least a portion of a flow aperture, wherein the flow aperture may be disposed in the bleed flow path and may permit fluid communication between the bleed inlet and the bleed outlet.

In further accordance with any one or more of the foregoing first and second aspects, the internal valve assembly and/or internal valve may further include any one or more of the following preferred forms.

In a preferred form, the spring seat may include a body and an outer portion. The body may be disposed between the guide and the outer portion, and the outer portion may be disposed adjacent to an inner wall of the bore of the bleed valve body.

In a preferred form, the body may include a connecting portion connected to the outer portion and partially defining the flow aperture.

In a preferred form, the flow aperture may be bound in part by the bore of the bleed valve body.

In a preferred form, the guide may be a circular bore and the spring seat may include an inner ring surrounding the guide and an outer ring surrounding the inner ring. The outer ring may be connected to the inner ring by the connecting portion. The flow aperture may be disposed between the inner ring and the outer ring and may be bound in part by the connecting portion.

In a preferred form, the body of the spring seat may be arranged to engage the spring.

In a preferred form, the outer portion of the spring seat may be arranged to engage the spring.

In a preferred form, the outer portion of the spring seat may be arranged to engage the bore of the bleed valve body.

In a preferred form, the spring seat may include a plurality of flow apertures, and at least one of the plurality of flow apertures may be defined by an arcuate cutout.

In a preferred form, the spring seat may include an inlet side and an outlet side, the inlet side facing the bleed inlet and the outlet side facing the bleed outlet. In one form, a first portion of the inlet side may be disposed on a first plane and a second portion of the inlet side may be disposed on a second plane spaced away from the first plane. In another form, a first portion of the outlet side is disposed on a first plane and a second portion of the outlet side is disposed on a second plane spaced away from the first plane.

In a preferred form of the spring seat, a third portion of the inlet side of the spring seat may be disposed on a third plane different from the first plane and the second plane.

In a preferred form of the internal valve, the poppet valve may include a valve disc shiftable between the open position and the closed position. The spring seat may be operable to guide the valve disc along a longitudinal axis of the bore when the valve disc shifts between the open position and the closed position.

In a preferred form of the internal valve, a ring may be coupled to the valve stem and adjacent to the spring seat, wherein the spring seat may be retained between the spring and the ring.

In a preferred form, the spring seat may include a groove sized to receive the spring, the groove configured to limit horizontal movement of the spring relative to the valve stem.

In a preferred form of the internal valve assembly, a different spring disposed in the main flow path and operatively coupled to the valve stem. The different spring may be arranged to bias the valve stem toward the first position.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several Figures, in which:

FIG. 16 is a schematic of the internal valve assembly of FIG. 1 attached to an upstream fluid source according to the teachings of the present disclosure.

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
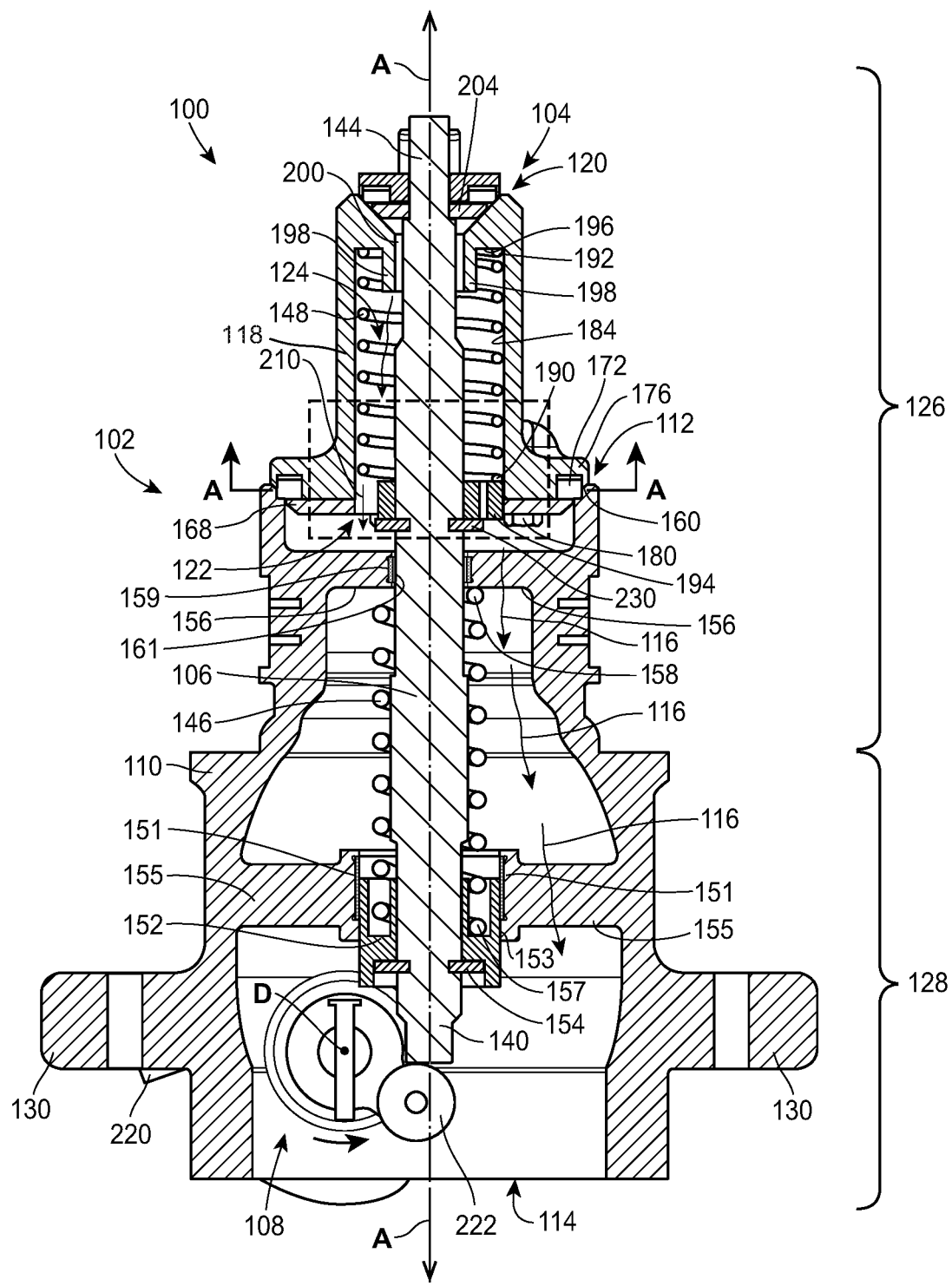
FIG. 1 is a cross-sectional view of an internal valve assembly in a closed configuration according to the teachings of the present disclosure.

FIG. 1 illustrates an example internal valve 100, also referred herein as an internal valve assembly, including a poppet valve 102, a bleed valve 104, a valve stem 106, an actuator 108, and a valve body 110. The valve body 110 includes an inlet 112, an outlet 114, and defines a main fluid flow path 116 between the inlet 112 and the outlet 114. The poppet valve 102 is arranged to open and close the inlet 112 of the valve body 110 based on a pressure and/or a fluid flow rate of a system in which the internal valve 100 is coupled or installed. In high pressure environments, it may be necessary to equalize the pressure between an upstream fluid source and a downstream fluid source or fluid container before the fluid is pumped through the internal valve 100. Such equalization may be achieved by the bleed valve 104. The bleed valve 104 includes a bleed valve body 118 having a bleed inlet 120, a bleed outlet 122, and defining a bleed flow path 124 between the bleed inlet 120 and the bleed outlet 122. The valve stem 106 is slidably disposed in the valve body 110 as well as the bleed valve body 118 and is operatively coupled to both the bleed valve 104 and to the actuator 108.

The internal valve 100 may be installed so that a first or upper portion 126 of the valve 100 is arranged to be in fluid communication with a first or upstream fluid source, e.g., a pipeline, a bobtail truck, or a tank, at which relatively high pressure process fluid may be introduced. A second or lower portion 128 of the valve 100 is arranged to be in fluid communication with a second or downstream fluid source, e.g., a pump, a pipeline, or a hose, a bobtail truck, to which the internal valve 100 provides the process fluid. The valve body 110 includes a flanged portion 130 for coupling (e.g., mounting) the internal valve 100 to a piping system, a storage tank, a bobtail truck system, or any other suitable fluid distribution system. For example, FIG. 16 illustrates the internal valve 100 in fluid communication with an upstream fluid source in the form of a tank 131 containing a fluid, such as a pressurized gas or liquid, to be delivered to a destination via the internal valve 100. The first portion 126 of the internal valve 100, which includes the entire bleed valve 104, may be immersed in or surrounded by relatively high pressure fluid. The second portion 128 may be disposed outside of the tank 131 to receive a conduit 132, such as a pipe, a hose, or any other suitable conduit, at the outlet 114 of the valve body 110. The process fluid may flow from the tank 131 via a conduit 134, such as a hose, and through the internal valve 100. When the bleed valve 104 is open, the process fluid may flow through the bleed flow path 124 and the main flow path 116, through the outlet 114 of the valve body 110, and to a destination such as, for example, another storage tank and/or additional process control system. When the poppet valve 102 is open, the process fluid may flow through the inlet 112, through the main fluid flow path 116, and out the outlet 114 of the valve body 110.

The actuator 108 may be removably coupled to the body 110 so that the actuator 108 can be removed without having to remove the valve 100 from the system while the internal valve 100 is in-line with the system. The actuator 108 includes a lever 220 coupled to a rotatable cam 222 which rotates the cam 222 about an axis D to engage the bottom end 140 of the valve stem 106 and shift the valve stem 106 in the axial direction. While the actuator 108 in the illustrated example includes the rotatable lever 220 and the cam 222, the internal valve assembly 100 of the present disclosure is not limited to the illustrated actuator arrangement. For example, in other embodiments the actuator 108 may be an automated or manually-operated rotatable or linear drive mechanism arranged to shift the valve stem 106 between the first, second, and third positions. Moreover, another embodiment of the valve 100 may include an additional operating position in which the actuator 108 shifts the valve stem 106 to a position between any two of the first, second, and third positions. In one such additional operating position, both the bleed valve 104 and the poppet valve 102 may be open.

The function and operation of the internal valve assembly 100 will be described in four sequential operating configurations: a closed configuration shown in FIG. 1, a jet bleed configuration shown in FIG. 2, an open configuration shown in FIG. 3, and a limited bleed configuration shown in FIG. 4. The operating configurations of the valve 100 may be selected by the actuator 108, which is operatively coupled to a bottom end 140 of the valve stem 106. The actuator 108 is operable to shift the valve stem 106 between first, second, and third positions. The valve stem 106 may be shiftable along a longitudinal axis A of the internal valve 100 or along an axis parallel to the longitudinal axis A. When the valve stem 106 is in the first position, both the poppet valve 102 and the bleed valve 104 are closed and the actuator 108 does not engage with or connect with the bottom end 140 of the valve stem 106. A first spring 146 is arranged to bias the internal valve 100 in the closed position. Opposite the bottom end 140, a top end 144 of the valve stem 106 is operatively coupled to the bleed valve 104, enabling the actuator 108 to control the bleed valve 104 by moving the valve stem 106 along the longitudinal axis A. A second spring 148 is arranged to bias the poppet valve 102 between the open position and the closed position to respond to fluid pressure changes. As will be explained in further detail below, the second spring 148 is arranged to shift the poppet valve 102 toward the closed position and is arranged to open the bleed valve 104 while the valve stem 106 is in the third position.

The valve body 110 of the internal valve 100 encloses the first spring 146 and a portion of the valve stem 106. The first spring 146 is retained between a first spring seat 162 and a first set of inwardly extending portions 156 of the valve body 110, with a first end 157 of the spring 146 seated against a surface of the first spring seat 152 and a second end 158 of the spring 146, opposite the first end 157, seated against the inwardly extending portions 156. The first spring 146 may be a closing spring and is operatively coupled to the valve stem 106 via the first spring seat 152, and is arranged to bias the valve stem 106 in a downward direction to close the poppet valve 102 and the bleed valve 104. The first spring 146 provides a downward spring force to the valve stem 106, urging the valve stem 106 to occupy the first position shown in FIG. 1. The inwardly extending portions 156 define an annular bore 161 in which a bushing 159 is disposed. The bushing 159 guides the stem 106 through the body 110 and facilitates smooth axial movement of the valve stem 106. Further, the valve body 110 defines a seating surface or valve seat 160 at the inlet 112, which leads to an orifice 164 connecting the upstream fluid source to the main fluid flow path 116. When the poppet valve 102 is in the open position, the main fluid flow path 116 is established between the inlet 112 and the outlet 114.

The poppet valve 102 is coupled to the valve body 110 and is operable to open and close the inlet 112 of the valve body 110. The poppet valve 102 is also operatively coupled to the bleed valve body 118. When the poppet valve 102 shifts between an open position to open the inlet 112 and a closed position to close the inlet 112, the bleed valve body 118 moves toward and away from the inlet 112 of the valve body 110. In other words, in the illustrated example of the internal valve 100, the bleed valve body 118 is inherently part of the operation of the poppet valve 102. In the illustrated example, the bleed valve body 118 is depicted as a disc-type valve assembly that includes or carries a valve disc 168 of the poppet valve 102 that engages the valve seat 160 to restrict the flow of fluid through the valve body 110. The poppet valve 102 is shiftable between an open position in FIG. 3 where the valve disc 168 and the bleed valve body 118 are spaced away from the valve seat 160, and a closed position in FIGS. 1, 2, and 4 where the valve disc 168 is seated against the valve seat 160. A disc retainer 172 couples the disc 168 to a disc holder portion 176 of the bleed valve body 118 by one or more fasteners 180.

The bleed valve 104 is coupled to the valve stem 106, and includes the bleed valve body 118 having a bore 184 that houses the second spring 148. The second spring 148 may be an excess flow spring and is arranged to bias the bleed valve body 118 toward the seating surface 160 to restrict the fluid flow through the orifice 164 when the flow rate through the valve 100 exceeds a specified or predetermined flow rate, e.g., an excess flow limit or rate of the valve 100. The second spring 148 includes a bottom end 190 and a top end 192, and is retained between a second spring seat 194 and a shoulder 196, which is defined by the bore 184 and a cylindrical portion 198. The top end 192 of the second spring 148 bears against the shoulder 196 and the bottom end 190 of the second spring 148 bears against the second spring seat 194. The second spring seat 194 is operatively coupled to the valve stem 106 such that the second spring seat 194 moves with the valve stem 106 as the stem 106 shifts in the axial direction along the longitudinal axis A. The spring seat 194 defines at least a portion of one or more flow apertures 210 disposed in the bleed flow path, which permits fluid communication between the bleed inlet 120 and the bleed outlet 122. A bleed port 200 may be integrally formed with the bleed valve body 118, and in particular, may be defined as the opening formed by the cylindrical portion 198 of the bleed valve body 118. The bleed port 200 is disposed within the bleed flow path 124 and fluidly connects the bleed inlet 120 and the bore 184, and the bore 184 fluidly connects the bleed inlet 120 and the bleed outlet 122. A bleed disc 204 is shiftable between an open bleed position, shown in FIGS. 2 and 4, where the bleed disc 204 is spaced away from a bleed seat 208 and the bleed port 200, and a closed bleed position, shown in FIGS. 1 and 3, where the bleed disc 204 is seated against the bleed seat 208, sealing the bleed port 200 from the upstream fluid source. Taken together, the poppet valve 102 and the bleed valve 104 form the internal valve 100.

Turning now specifically to FIG. 1, the internal valve 100 is in the first or closed operating configuration. In the closed configuration, the poppet valve 102 is in the closed position and the bleed valve 104 is in the closed bleed position such that the outlet 114 is sealed off from the upstream fluid source. The valve disc 168 carried by the bleed valve body 118 is biased toward the closed position by the second spring 148 and/or by the pressure of the upstream fluid source at the inlet 112. The bleed disc 204 of the bleed valve 104 is biased toward the closed bleed position by the first spring 146 via the valve stem 106. When both the poppet valve 102 and the bleed valve 104 are closed, the valve disc 168 engages the valve seat 160 to prevent the flow of fluid through the orifice 164, and the bleed disc 204 engages the bleed seat 208 to prevent the flow of fluid through the bleed port 200.

In FIG. 1, the operating lever 220 of the actuator 108 is in a first position whereby the rotatable cam 222 does not engage the bottom end 140 of the valve stem 106. When, however, the actuator 108 is operated to shift the valve stem 106 in the axial direction along the longitudinal axis A from the position shown in FIG. 1 to the position shown in FIG. 2, the lever 220 is moved to a second position, which causes the cam 222 to rotate about the axis D until the cam 222 engages the bottom end 140 of the valve stem 106. In this example, the second position of the lever 220 corresponds to a midpoint of its travel path positioned 35 degrees relative to the first position. Movement of the valve stem 106 to the position shown in FIG. 2 compresses the first spring 146 between the first spring seat 152 and the valve body 110, causing the bleed disc 204 to move away from the bleed seat 208, thereby moving the internal valve 100 from the closed operating configuration to the jet bleed configuration.

Figure 2:
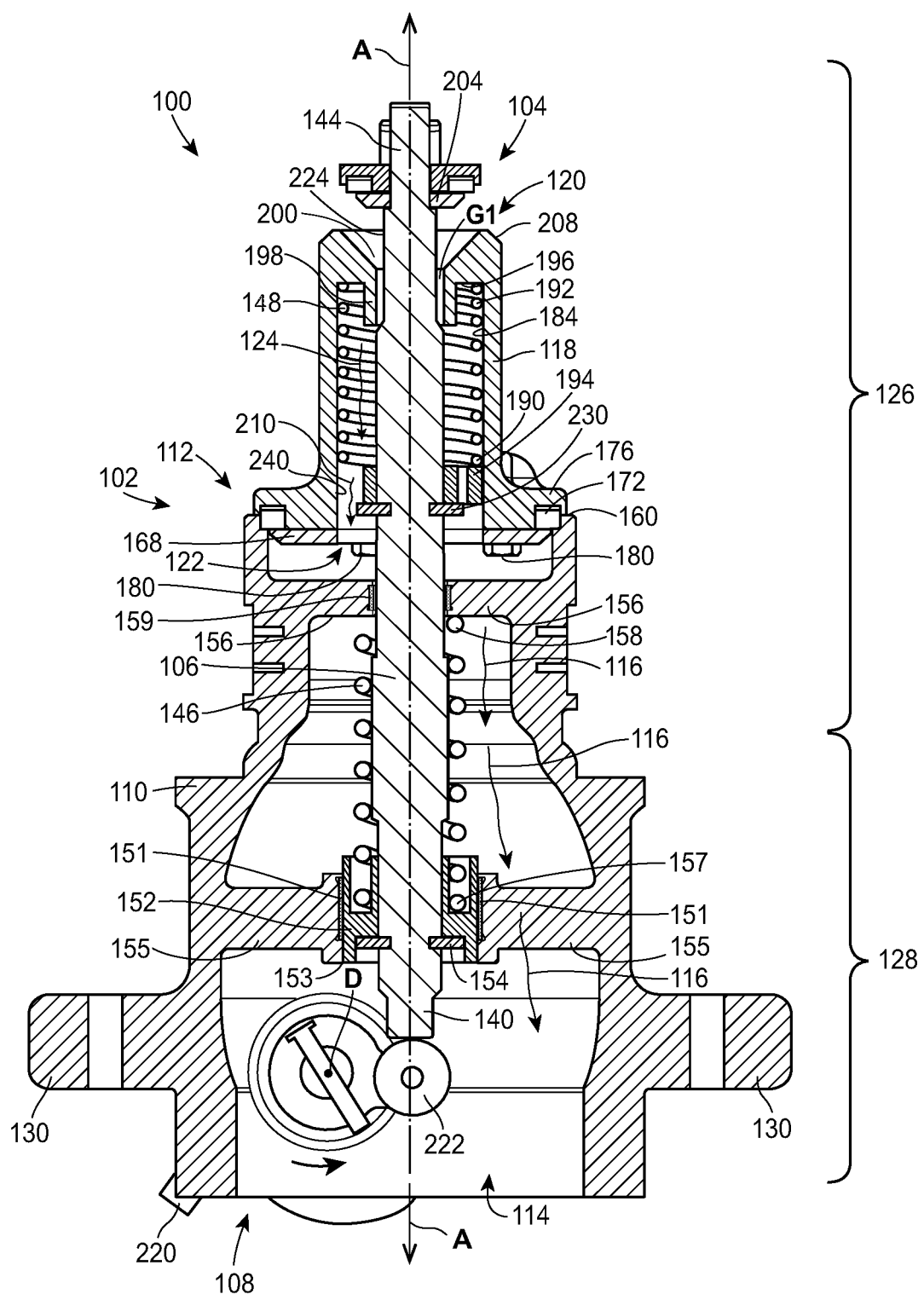
FIG. 2 is a cross-sectional view of the internal valve assembly of FIG. 1 in a jet bleed configuration.

In the jet bleed configuration of FIG. 2, the valve stem 106 is in the second position and the poppet valve 102 remains closed, but bleed valve 104 is in the open position, thereby permitting fluid from the upstream fluid source to enter the bleed inlet 120 and equalize the pressure differential across the valve 100. A portion of the valve stem 106 that is disposed in the bleed port 200 includes a reduced diameter or a recessed portion 224 to permit fluid flow between the cylindrical portion 198 of the bleed valve body 118 and the valve stem 106. In the jet bleed configuration, the recessed portion 224 forms a gap G1 between the valve stem 106 and the bleed port 200. So configured, the bleed valve 104 may allow for greater fluid flow through the bleed port 200 to the bleed flow path 124, which may result in quicker pressure equalization across the valve 100. The flow aperture(s) 210 formed in the second spring seat 194 fluidly connects the bleed flow path 124 to the inlet 112 of the poppet valve 102, permitting fluid to continuously flow through the valve 100 until the upstream pressure and downstream pressure are nearly equal. The poppet valve 102 remains in the closed position until a pressure of the upstream fluid source is less than the spring force of the second spring 148, causing the second spring 148 to expand and push the bleed valve body 118 upward in the axial direction toward the open position. The gap G1 provided by the placement of the recessed portion 224 of the stem 106 relative to the bleed port 200 together with the flow aperture(s) 210 of the second spring seat 194 may expedite equalization of the internal valve 100.

The first spring 146 and the second spring 148 are compressed while fluid flows from the upstream fluid source through the bleed valve 104 and into the poppet valve 102. The first spring seat 152 is movably (e.g., slidably) disposed in a guide sleeve 151 (e.g., a bushing) seated in an annular bore 153 defined by and between a second set of opposed inwardly extending portions 155 of the valve body 110, and is coupled to the valve stem 106 via a retaining feature 154 such that the first spring seat 152 is movably (e.g., slidably) disposed in the body 110 relative to the guide sleeve 151 and the bore 153 of the valve body 110. The first spring seat 152 thus applies a force (in this case, an upward force) against the first spring 146 when the valve stem 106 shifts upward, causing the first spring 146 to compress against the first set of inwardly extending portions 156 of the valve body 110. Further details regarding the second spring seat 194 are described in co-pending U.S. Non-Provisional application Ser. No. 15/635,904, filed Jun. 28, 2017 and entitled "Spring Seat for an Internal Valve." The second spring seat 194 is operatively coupled to the valve stem 106 via a ring 230, e.g., a clip, and moves further into the bore 184 of the bleed valve 104 as the valve stem 106 shifts upward in the axial direction. The second spring 148 compresses between the shoulder 196 of the bleed valve body 118 and the second spring seat 194. Depicted in FIG. 2, the force exerted by the second spring 148 onto the shoulder 196 and spring seat 194 is not yet sufficient to overcome the force of pressure of the upstream fluid source on the poppet valve 102, and therefore the poppet valve 102 remains in the closed position. In another example, the second spring seat 194 may be coupled to the valve stem 106 by a pin extending through the valve stem 106 or by a notch or a groove formed in the surface of the valve stem 106.

When the actuator 108 is operated to shift the valve stem 106 in the axial direction from the second position (FIG. 2) to a third position (FIG. 3), the lever 220 is moved to a third position by completing its travel path, thereby further rotating the cam 222 about the axis D and driving the valve stem 106 further upward. Movement of the valve stem 106 to the position shown in FIG. 3 further compresses the first spring 146 and the second spring 148, which forces the poppet valve 102 to open as the pressure of the upstream fluid source approximately equals the pressure of the downstream fluid source, thereby moving the internal valve 100 from the jet bleed configuration to the open operating configuration.

Figure 3:
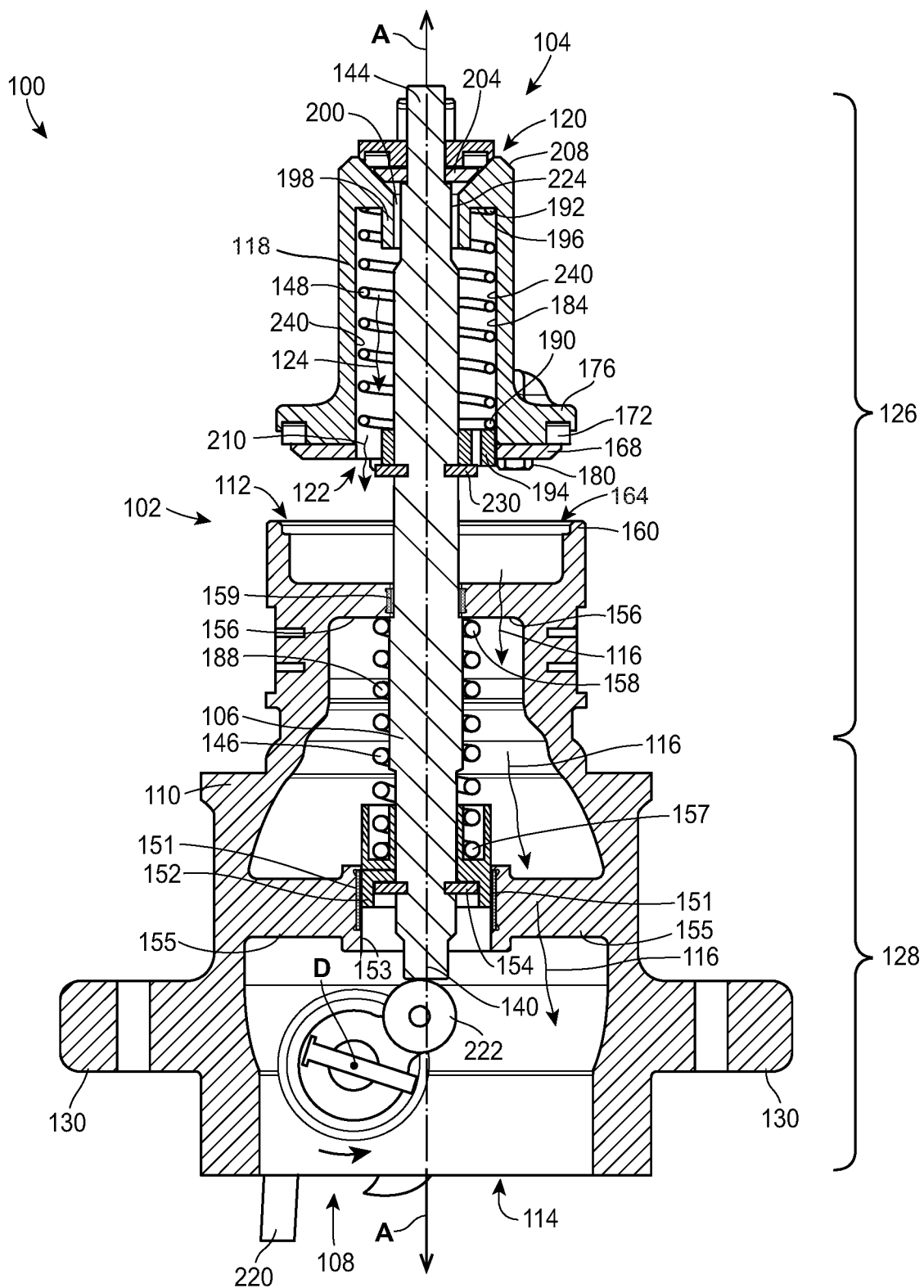
FIG. 3 is a cross-sectional view of the internal valve assembly of FIG. 1 in an open configuration.
Figure 4:
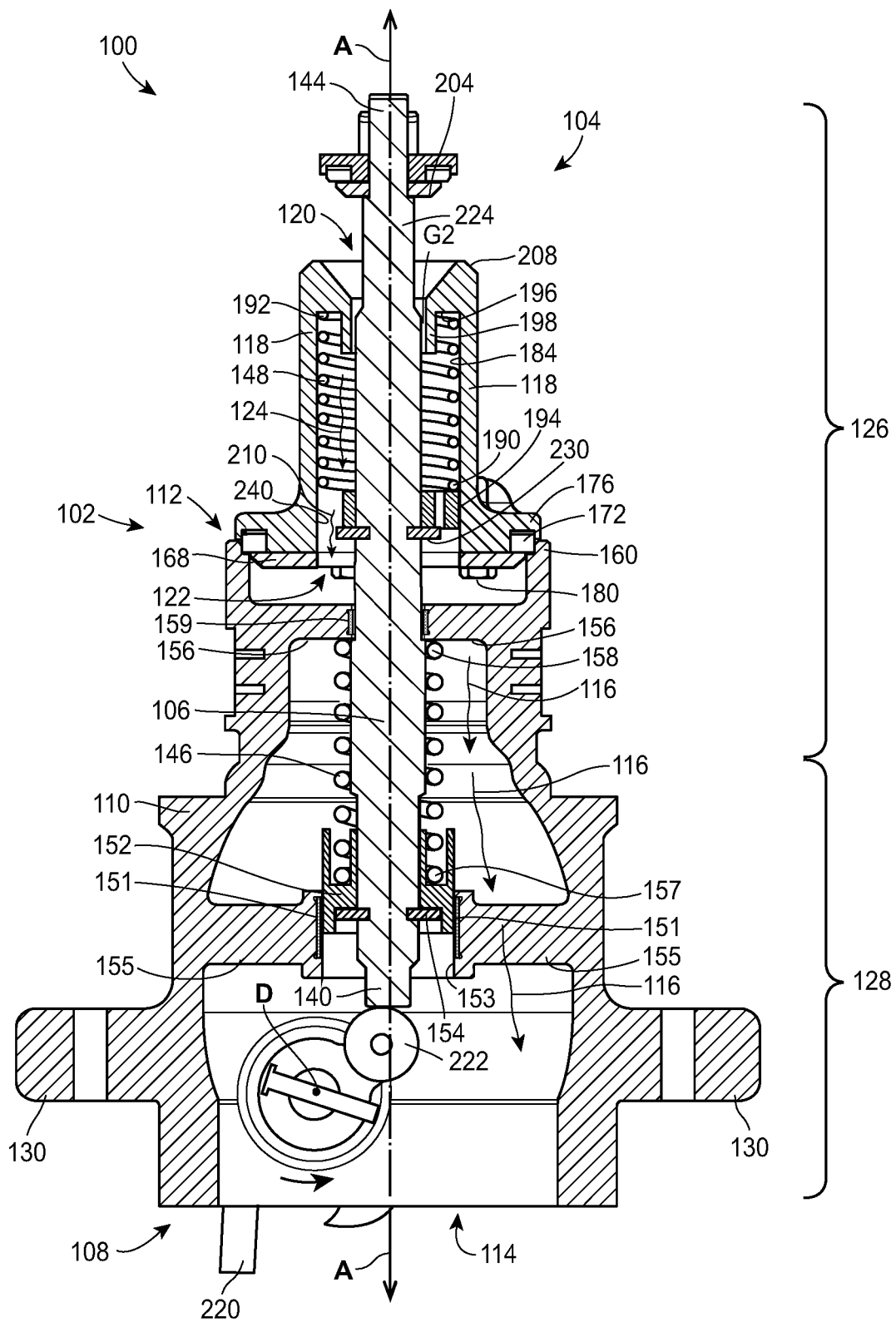
FIG. 4 is a cross-sectional view of the internal valve assembly of FIG. 1 in a limited bleed configuration.

FIG. 3 illustrates the internal valve 100 in the open operating configuration, where the poppet valve 102 is in the open position, permitting fluid to flow from the upstream pressure source into the inlet 112 of the valve 100, into the orifice 164, through the main flow path 116, and out of the valve 100 via the outlet 114. The bleed seat 208 of the bleed valve body 110 meets the bleed disc 204 when the second spring 148 expands in the axial direction and shifts the bleed valve body 118 upward and away from the inlet 112. In response to the pressure differential across the valve 100, the expansion of the second spring 148 causes the second spring seat 194 to slide downward within to the bore 184.

When, however, the upstream pressure overcomes the spring force of the second spring 148, the poppet valve 102 is moved back to the closed position. Alternatively, the flow rate through the valve 100 may exceed a specific or predetermined flow rate, causing the bleed valve body 118 to move toward the valve seat 160 to close the poppet valve 102. In any event, the closing of the poppet valve 102 moves the valve 100 from the open operating configuration illustrated in FIG. 3 to the limited bleed configuration illustrated in FIG. 4. In the limited bleed configuration, the bleed valve 104 is in the open bleed position. The recessed portion 224 of the valve stem 106 is thus placed above the bleed port 200. In this position, the recessed portion 224 is not disposed in the bleed port 200 sufficiently to form gap G1, and instead a gap G2 is defined between the valve stem 106 and the valve port 200. Gap G2 is smaller than gap G1 formed by the recessed portion 224 of the valve stem 106 and the valve port 200 in the jet bleed configuration. The formation of gap G2 permits a limited amount of fluid to bleed through the bleed port 200 relative to the amount of fluid that is permitted to bleed through the bleed port 200 in the jet bleed configuration.

According to the teachings of the present disclosure, the bleed valve 104 and the poppet valve 102 provide an excess flow functionality that maintains system safety and permits the bleed valve 104 and the poppet valve 102 to open and close, as illustrated in FIGS. 1-4. The excess flow function protects the system by automatically restricting fluid flow into the inlet 112 when a flow rate becomes too high within the valve 100. In particular, the poppet valve 102 operates based on a pressure differential between the inlet pressure and the outlet pressure, and the second spring 148 has an excess flow spring rate that causes the bleed valve body 118 and the valve disc 168 to move toward the seating surface 160 when the flow rate through the valve 100 exceeds a specific or predetermined flow rate. When the inlet pressure is substantially greater than the outlet pressure, the bleed valve body 118 carrying the valve disc 168 remains biased toward the seating surface 160 in the closed configuration depicted in FIG. 1. The bleed valve 104 is arranged to equalize or balance the pressure between the inlet 112 and outlet 114, and the bleed valve 104 may place the valve 100 in the jet bleed configuration shown in FIG. 2 to allow a certain amount of fluid to bleed into the internal valve 100. When the inlet pressure is approximately equal to the outlet pressure, the second spring 148 opens the poppet valve 102 to allow fluid to flow through the internal valve 100 as shown in FIG. 3. Once the poppet valve 102 opens, a fluid flow greater than the spring rate of the second spring 148 may force the poppet valve 102 to close against the second spring 148 shown in FIG. 4. In the limited bleed configuration, the bleed valve 104 is opened to permit a smaller amount of fluid to bleed into valve 100.

The second spring seat 194 will be described both in the context of the internal valve 100 in FIGS. 5 and 6, and in three different exemplary arrangements shown in FIGS. 7-10. While the first example second spring seat 194 is illustrated within the internal valve 100 in FIGS. 1-4, the present disclosure is not intended to limit the illustrated second spring seat 194 to the internal valve 100. As will be described below with FIGS. 9 and 10, second and third example springs seats 394 and 594 may be arranged within the internal valve 100 in the same or similar manner as the second spring seat 194.

Figure 5:
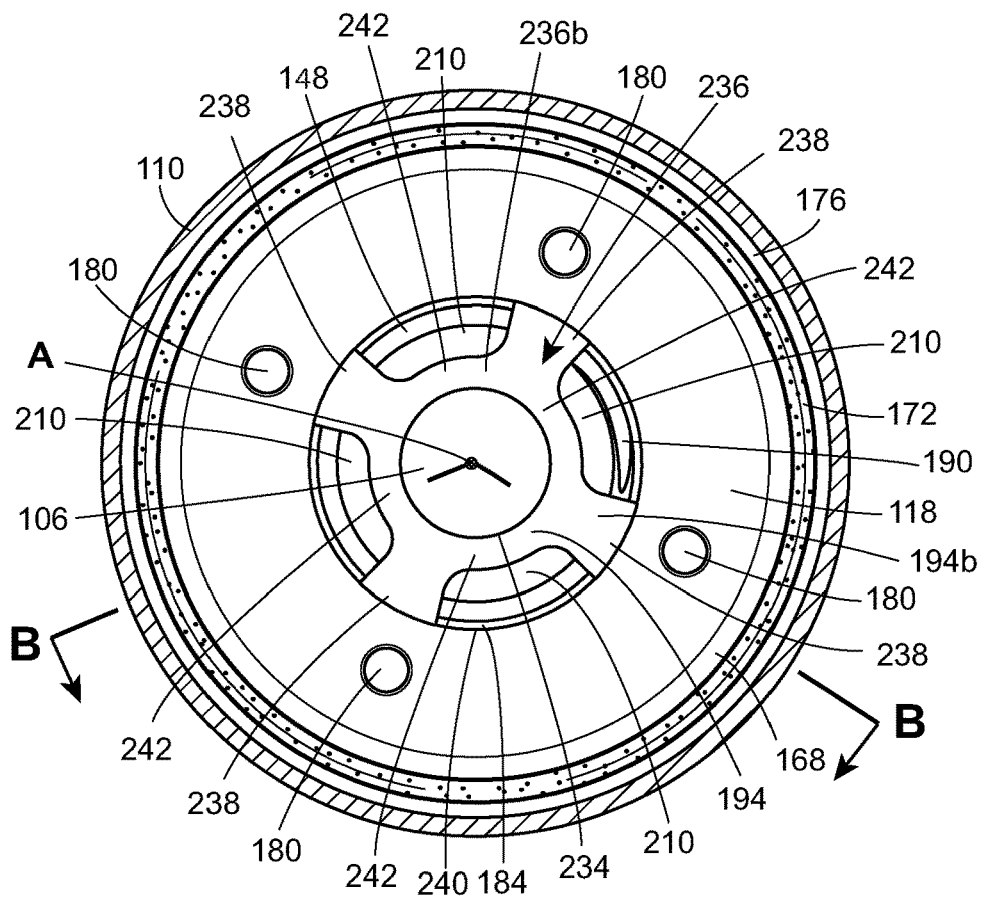
FIG. 5 is a cross-sectional view of the internal valve assembly of FIG. 1 taken at A-A.

Turning first to FIG. 5, the first example of the second spring seat 194, hereinafter referred to as "the spring seat" or "the first example spring seat" for clarity, is illustrated within the internal valve 100. As briefly discussed above, the spring seat 194 is sized to fit within the bore 184 of the bleed valve body 118 and is coupled together to the valve stem 106 such that the spring seat 194 slides within the bore 184 as the valve stem 106 moves in the axial direction along the longitudinal axis A. The spring seat 194 includes a guide 234 sized to receive the valve stem 106. In the illustrated example, the guide 234 is a circular bore, and the valve stem 106 and the guide 234 are operatively coupled by a friction fit such that the valve stem 106 does not slide or slip relative to the spring seat 194 during operation. In other examples, the guide 234 may at least partially defined by a segmented hole formed by a plurality of connecting portions. As also briefly described above, the spring seat 194 is retained between the bottom end 190 of the second spring 148 and the ring 230, with both the second spring 148 and the ring 230 serving to keep the spring seat 194 coupled to the valve stem 106.

The spring seat 194 of the present disclosure may improve fluid flow through the internal valve 100 and, more specifically, through the bleed valve 104 by providing a plurality of flow apertures 210. In the preferred example, the spring seat 194 includes four flow apertures 210 approximately evenly spaced around the guide 234. In other examples, the spring seat 194 may include more or fewer flow apertures and/or the apertures 210 can be spaced differently. The spring seat 194 defines at least a portion of each flow aperture 210, and the flow apertures 210 are disposed within the bleed flow path 124 to permit fluid communication between the bleed inlet 120 and the bleed outlet 122. Any fluid entering the bleed inlet 120 may pass through the flow aperture 210 (in some cases contacting the spring seat 194) before the fluid reaches the bleed outlet 122. In the preferred example, the spring seat 194 includes four flow apertures 210 approximately evenly spaced around the guide 234. Moreover, when the valve disc 168 is seated against the valve seat 160 in the jet bleed and limited bleed configurations of FIGS. 2 and 4, each flow aperture 210 may fluidly connect the bleed flow path 124 and the main flow path 116 of the valve body 110. In other examples, the spring seat 194 may include more or fewer flow apertures.

As shown in FIGS. 5-8, the flow apertures 210 of the spring seat 194 are defined by and between a body 236 of the spring seat 194 and outer portions 238 of the spring seat 194. The body 236 and the outer portions 238 provide support and axial guidance to the valve disc 168 and valve stem 106 when the poppet valve 102 opens and closes. The body 236 is disposed between the guide 234 and the outer portions 238, and the outer portions 238 are disposed within the bore 184 of the bleed valve 104 adjacent to an inner wall 240 of the bleed valve body 118 defining the bore 184 of the bleed valve 104. In a preferred arrangement, the outer portions 238 of the spring seat 194 are arranged to engage the inner wall 240 of the bleed valve body 118 defining the bore 184. In particular, the outer portions 238 of the spring seat 194 are arranged to slidingly engage the inner wall 240 such that contact between the outer portions 238 and the inner wall 240 does not substantially hinder or prevent the valve stem 106 from moving in the axial direction. The body 236 includes an inner ring 242 defining the guide 234 such that the inner ring 242 surrounds a portion of the valve stem 106. The inner ring 242 is sized to receive the valve stem 106 so that the spring seat 194 aligns with the longitudinal axis A of the valve stem 106 when the spring seat 194 is coupled to the valve stem 106. A height $L_I$ of the inner ring 242 may be equal to a height $L_O$ of the outer portion 238.

The body 236 also includes a plurality of projections 246, also referred to as connecting portions, that extend outward from the inner ring 242, include the outer portions 238, and, as such, join or connect the inner ring 242 of the body 236 and the outer portions 238. Each connecting portion 246 has a curved profile such that a width W of the connecting portion 246 increases as it extends away from the guide 234 and toward each corresponding outer portion 238. The curved profile of each connecting portion 246 partially defines an arcuate cutout 244 of a respective flow aperture 210 and each connecting portion 246 separates at least two different flow apertures 210. Thus, each of the four flow apertures 210 is bound or partially defined by the inner ring 242, the connecting portions 246, and the inner wall 240 of the bleed valve body 118. In the illustrated example, the connecting portions 246 are evenly spaced about a circumference of the guide 234. In other examples, the spring seat 194 may include fewer or more projections, linear and/or non-linear profiles, different geometries, and uneven spatial arrangements around the circumference of the guide 234.

Figure 6:
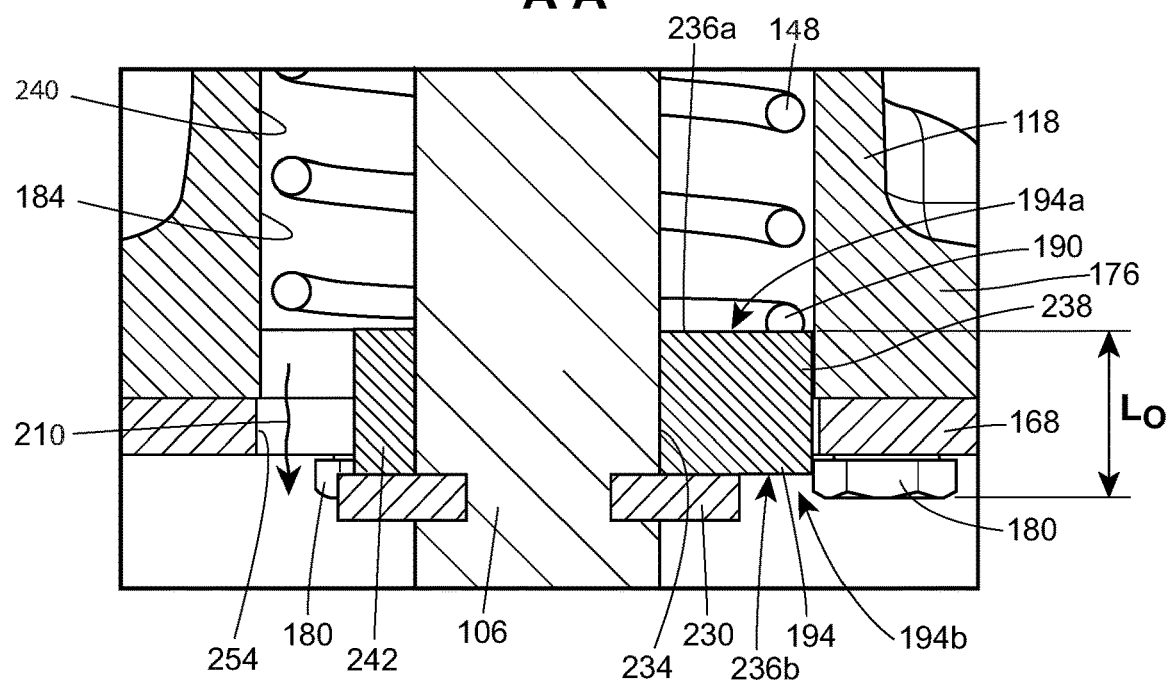
FIG. 6 is an enlarged fragmentary view of the internal valve and spring seat of FIG. 1 taken at cross-section B-B of FIG. 5.
Figure 7:
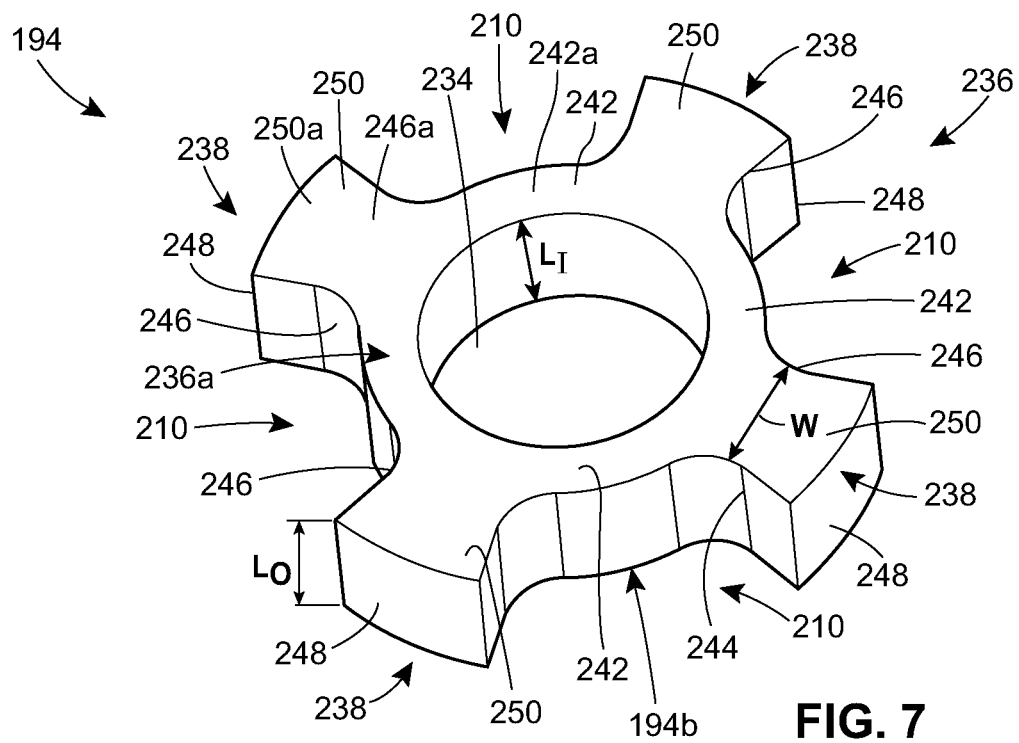
FIG. 7 is a perspective view of a first example spring seat according to the teachings of the present disclosure.
Figure 8:
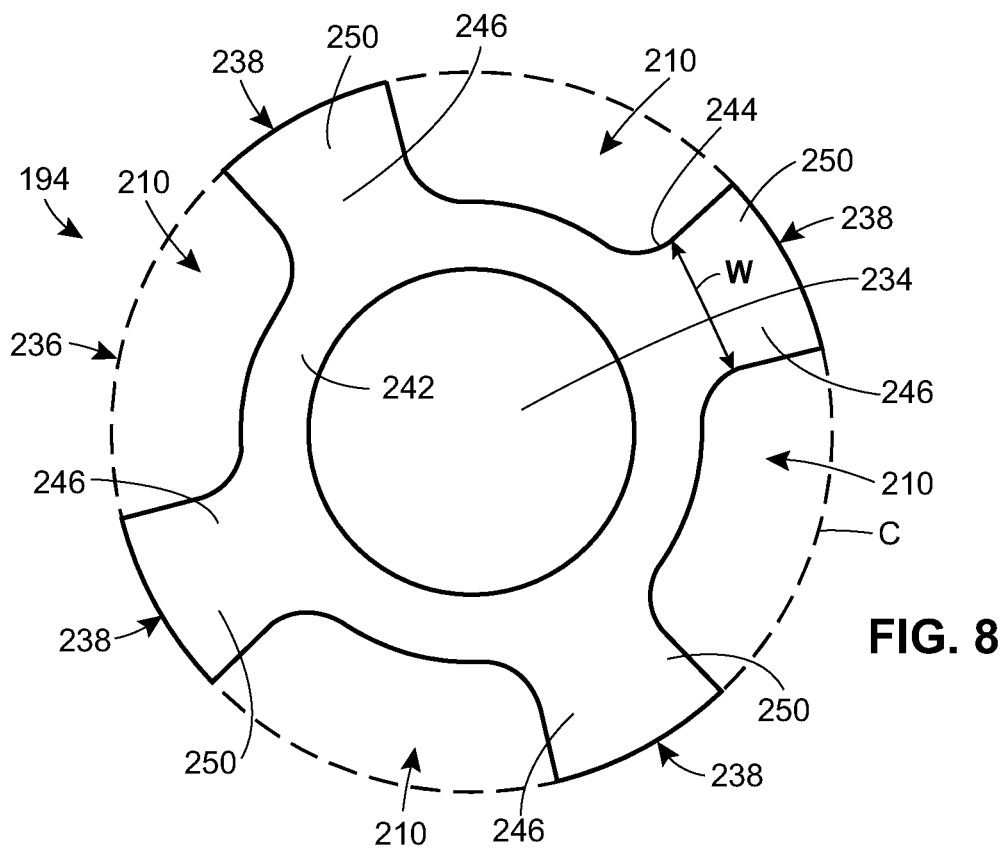
FIG. 8 is a top side elevational view of the spring seat of FIG. 7.

When disposed in the bleed flow path 124, the spring seat 194 includes an inlet side 194a facing the bleed inlet 120 and an outlet side 194b facing the bleed outlet 122, as best illustrated in FIG. 6. The body 236, connecting portions 246, and outer portions 238 each include an inlet side 236a, 246a, and 238a and an outlet side 236b, 246b, and 238b, respectively. Each outer portion 238 may include a vertical wall 248, which lies on an outer circumference C of the spring seat 194 shown in dashed lines in FIG. 8. An inlet side 238a of the outer portion 238 may be substantially horizontal relative to the vertical wall 248, and may provide a bearing surface 250 to receive the bottom end 190 of the spring 148. The vertical wall 248 of each outer portion 238 contacts the inner wall 240 of the bleed valve body 118 at a different interface, such that the four vertical walls 248 contact the inner wall 240 at four different interfaces. As shown FIG. 6, the vertical wall 248 of outer portion 238 may contact both the inner wall 240 of the bleed valve body 118 and an inner portion 254 of the valve disc 168. The vertical wall 248 of the outer portion 238 has a vertical height $L_O$, which may be the height of the interface between the spring seat 194 and the inner wall 240. The vertical wall 248 is shaped to mate or lie flush against the inner wall 240. The body 236 is arranged to engage the bottom end 190 of the spring 148, and in particular, the connecting portions 246 and/or the inner ring 242 are arranged to engage the bottom end 190 of the spring 148. Alternatively, the outer portions 238 and/or the connecting portions 246 may be arranged to engage the bottom end 190 of the spring 148. The bearing surface 250 may extend along on a flat plane, and in the first example spring seat 194, the bearing surface 250 is oriented on the same plane as the inlet side 236a of the body 236.

Figure 9:
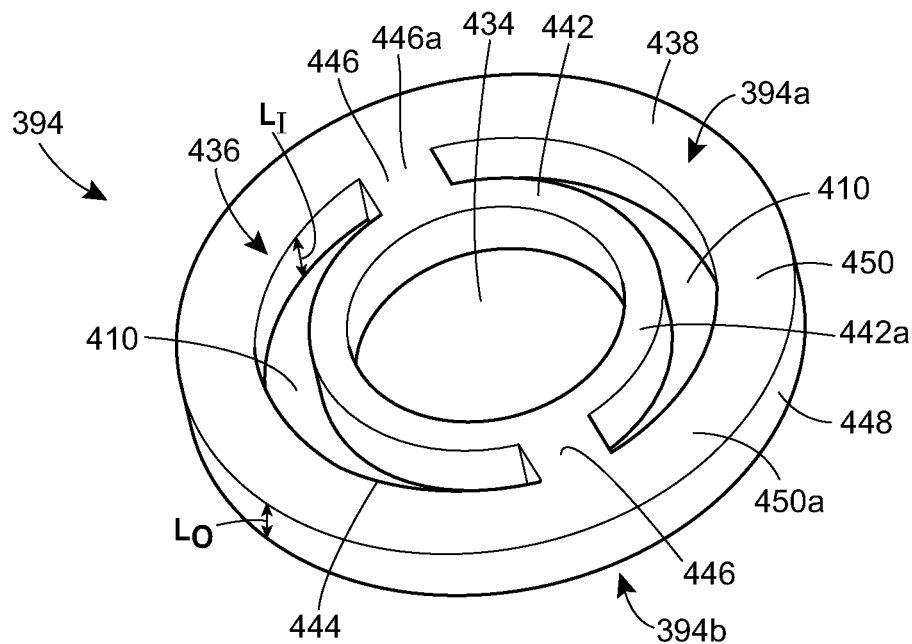
FIG. 9 is a second example spring seat according to the teachings of the present disclosure.
Figure 10:
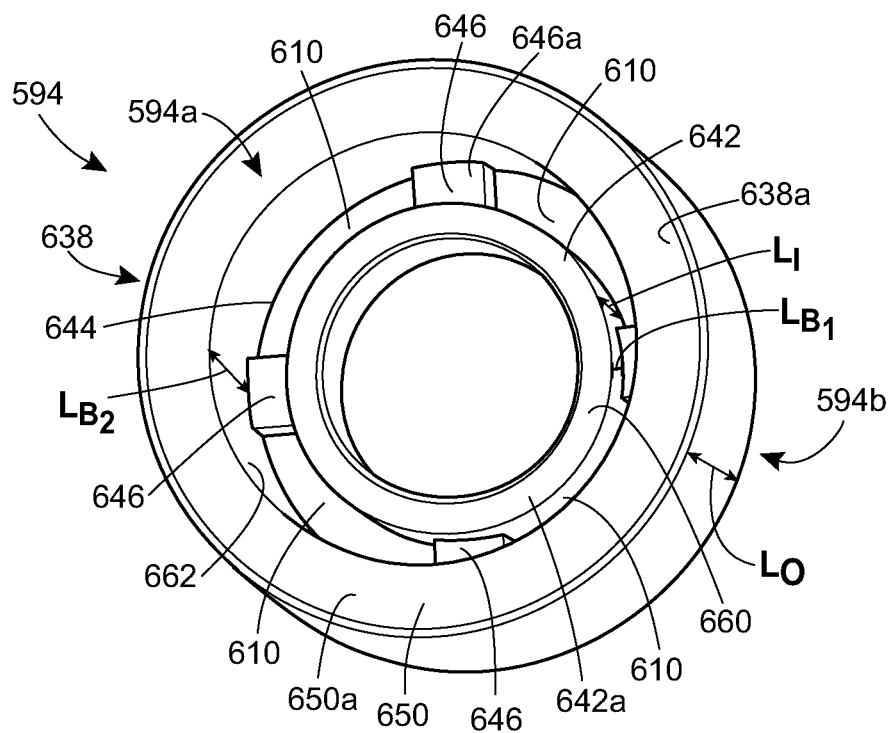
FIG. 10 is a third example spring seat according to the teachings of the present disclosure.

In FIG. 9 a second example spring seat 394 is illustrated, and in FIG. 10 a third example spring seat 594 is illustrated. Each of the spring seats 394 and 594 is similar to the first example spring seat 194 described above, except for the arrangements of the outer portions 438 and 638 and flow apertures 410 and 610 (which are different than the outer portions 238 and flow apertures 210). Other elements of the spring seats 394 and 594 in FIGS. 9 and 10 which are similar to the elements of the spring seat 194 are designated by the same reference numeral, incremented by 200 and 400, respectively. A description of many of these elements is abbreviated or even eliminated in the interest of brevity. Further, while not illustrated, it will be appreciated that the spring seats 394 and 594 may be incorporated into an internal valve such as the internal valve 100 of FIGS. 1-6.

FIG. 9 illustrates the second example spring seat 394 having an inner ring 442 and an outer portion 438, where the outer portion 438 forms an outer concentric ring and is connected to the inner ring 442 by two connecting portions 446. The inner ring 442 and the outer ring 438 are concentrically aligned relative to the guide 434, such that the inner ring 442 surrounds the guide 434 and the outer ring 438 surrounds the inner ring 442. The inner ring 442 is sized to receive the valve stem 106 so that the spring seat 394 is aligned with the longitudinal axis A of the valve stem 106 when the spring seat 394 is coupled to the valve stem 106. The spring seat 394 in this example includes two flow apertures 410 disposed and defined between the inner ring 442 and the outer ring 438, with the two flow apertures 410 bound in part, or separated from one another, by the connecting portions 446. The flow apertures 410 thus take the form of symmetrical semi-circular arcuate cutouts 444 between the outer ring 438 and the inner ring 442. An inlet side 438a of the outer ring 438 defines a bearing surface 450 arranged to receive or engage the bottom end 190 of the spring 148. Alternatively, an inlet side 446a of the connecting portions 446 may be arranged to receive the bottom end 190 of the spring 148. While illustrated as substantially horizontal relative to the vertical walls 248 and 448, the horizontal portions 250 and 450 of the first and second spring seats 194 and 394 may also have an angled surface. Moreover, while the inner ring 442 in this example is solid, the inner ring 442 can, in another example, be a segmented inner ring 442 partially surrounding a portion of the valve stem 106. Further, while in this example the guide 434 is defined by the inner ring 442, the guide may instead be defined by a plurality of connecting portions (e.g., connecting portions 446) extending inwardly from the outer portion.

In FIG. 10, the third example spring seat 594 includes an outer ring 638 and an inner ring 642 connected to the outer ring 638 by four connecting portions 646, where each connecting portion 646 partially defines two of the four flow apertures 610. Unlike the first and second example spring seats 194 and 394, an inlet side 594a of the spring seat 594 has an uneven surface such that an inlet side 646a of the connecting portions 646 are disposed on a first plane, an inlet side 642a of the inner ring 642 is disposed on a second plane, and an inlet side 638a of the outer portion 638 is disposed on a third plane. As shown by the placement of the connecting portion 646, the inner ring 642, and the outer portion 638, the first plane is spaced away from the second plane a distance $L_{B1}$, and the first plane is spaced away from the third plane a distance $L_{B2}$. In other examples, the inlet side 594a of the spring seat 594 may lie in more or less planes (e.g., one plane, three planes, etc.) and/or different planes.

When the spring 148 bears against the connecting portions 646 of the spring seat 594, the inner ring 642 and the outer ring 638 may provide barrier walls 660 and 662 on either side of the coil of the spring 148. For example, the inner ring 642 has a height $L_I$ and partially defines an inner barrier wall 660 having height $L_{B1}$ that extends from the inlet side 646a of the connecting portions 646 to the inlet side 642a of the inner ring 642. The outer portion or outer ring 638 has a height $L_O$ and partially defines an outer barrier wall 662 having height $L_{B2}$ that extends from the inlet side 646a of the connecting portions 646 to the inlet side 638a of outer ring 638. The inner and outer barriers 660 and 662 provide vertical guides or stops that partially surround the bottom end 190 of the spring 148 when the spring 148 bears against the spring seat 594. The inner and outer barrier walls 660 and 662 may assist in maintaining axial alignment of the spring 148 and the valve stem 106, minimizing horizontal movement or sway of spring 148 relative to the bleed valve body 118, and facilitating assembly of the spring 148 and the spring seat 594 within the internal valve 100. The inlet side 638a of the outer portion 638 may include an inclined or angled bearing surface 650 that slopes radially inward from the vertical wall 648 of the outer portion 638. In another example, the inlet side of the spring seat lie on one or more different planes.

Figure 11:
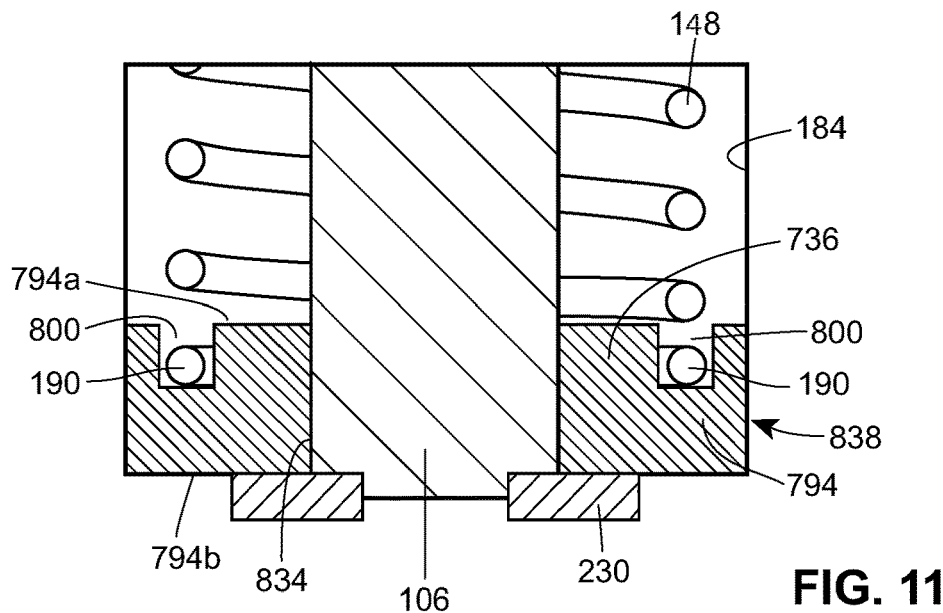
FIG. 11 is an enlarged fragmentary view of the internal valve assembly of FIG. 1 with a fourth example spring seat according to the teachings of the present disclosure.

FIG. 11 illustrates a cross-sectional view of the bottom end 190 of the spring 148 bearing against a spring seat 794. The spring seat 794 includes a groove 800 that is sized to receive the bottom end 190 of the spring 148, and any one of the first, second, and third spring seats 194, 394, and 594 depicted in FIGS. 1-10 may include the groove 800. The groove 800 may be formed in a portion of the spring seat 794 arranged to engage the bottom end 190 of the spring 148. The groove 800 facilitates assembly of the spring 148 within the bleed valve body 118, and may limit occurrences of sliding and other horizontal movement of the spring 148 during valve operation.

Figure 12:
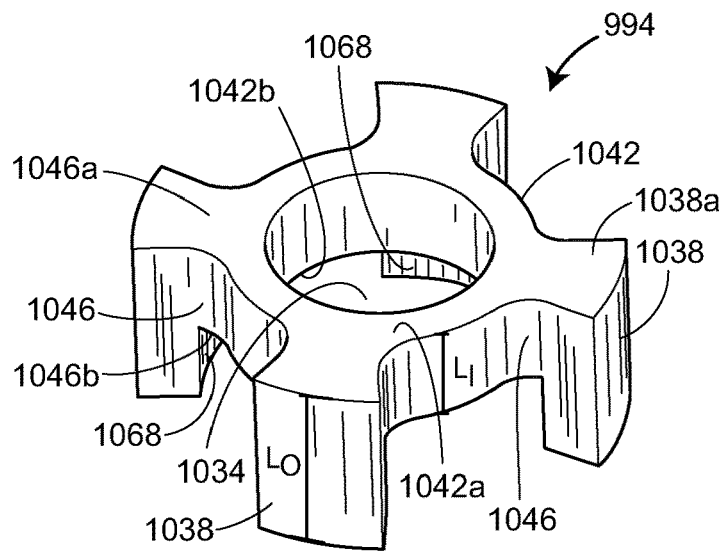
FIG. 12 is a fifth example spring seat according to the teachings of the present disclosure.
Figure 13:
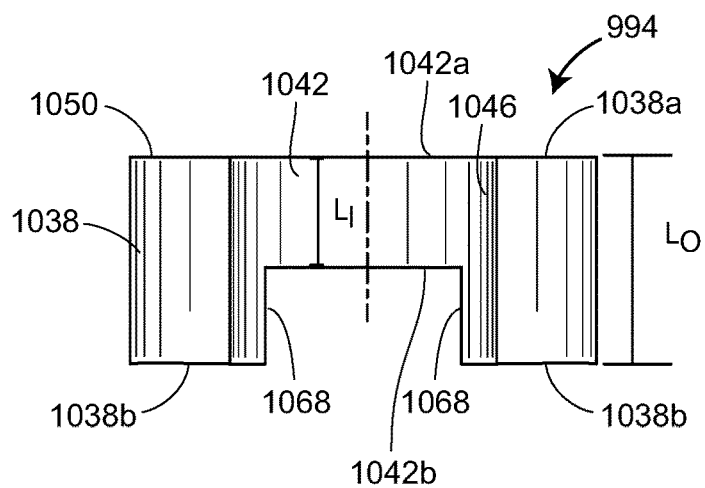
FIG. 13 is a front view of the fifth example spring seat of FIG. 12.
Figure 15:
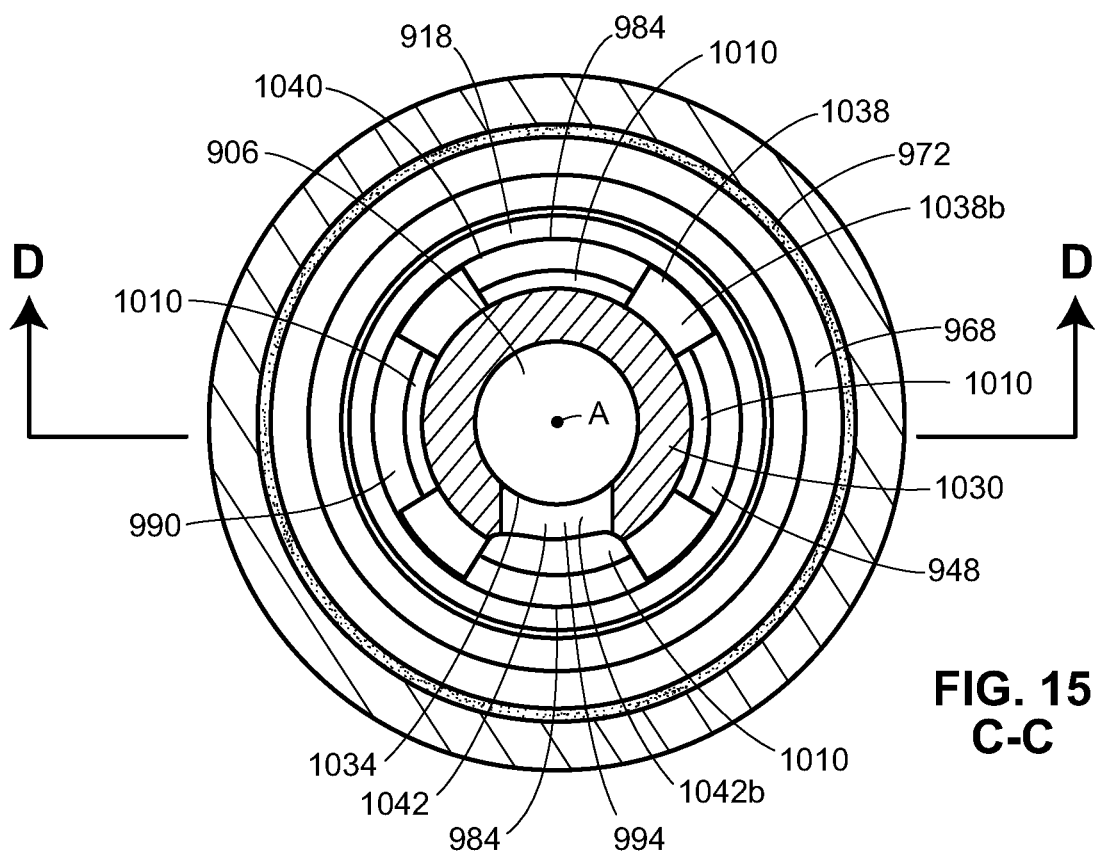
FIG. 15 is a cross-sectional view of the internal valve and spring seat of FIG. 14 taken at C-C.
Figure 14:
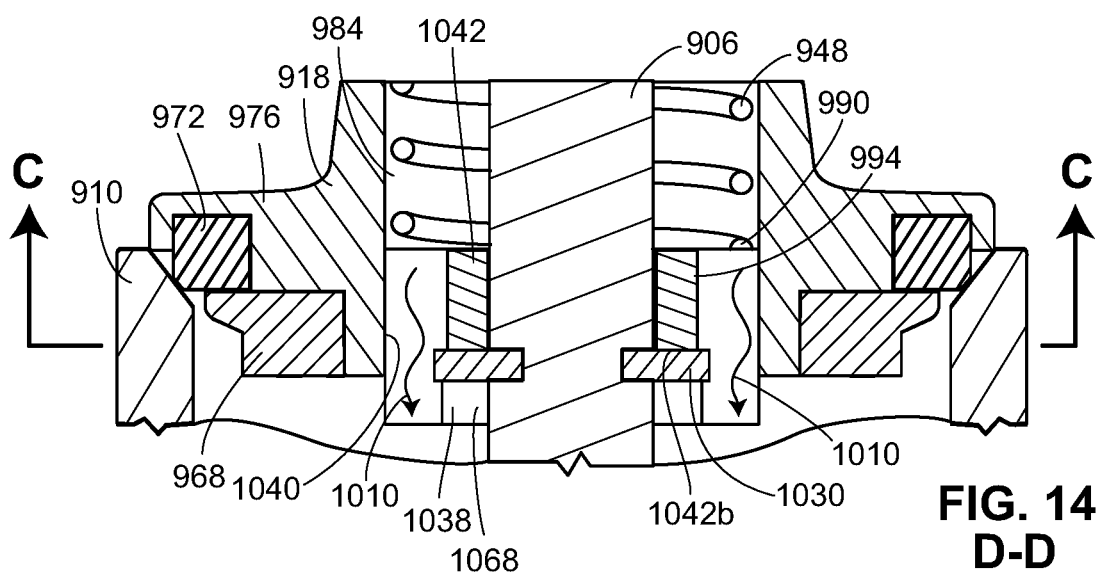
FIG. 14 is an enlarged fragmentary cross-sectional view of a different example internal valve assembly with the fifth example spring seat.

In FIGS. 12 and 13, a fifth example spring seat 994 is illustrated and in FIGS. 14 and 15, the fifth example spring seat 994 is incorporated into an internal valve 900. The spring seat 994 is similar to the first example spring seat 194 described above, except for the arrangement of the outer portions 1038 (which differ from the outer portions 238 of the first example spring seat 194). The internal valve 900 is similar to the internal valve 100, except for the arrangement of the valve disc 968, the ring 1030, and the bleed valve body 918 (which are slightly different than the valve disc 168, the ring 230, and the bleed valve body 118, respectively). Other elements of the spring seat 994 in FIGS. 12-15, which are similar to the elements of the spring seat 194, and elements of the internal valve 900 in FIGS. 14 and 15, which are similar to the elements of the internal valve 100, are designated by the same reference numeral, incremented by 800. A description of many of these elements is abbreviated or even eliminated in the interest of brevity. Further, while not illustrated, it will be appreciated that the spring seat 994 may be incorporated into an internal valve such as the internal valve 100 of FIGS. 1-6.

The fifth example spring seat 994 provides a boundary area to receive the ring 1030. The boundary area is defined by an interior surface 1068 of each of the outer portions 1038, an outlet side 1046*b* of each of the connector portions 1046, and an outlet side 1042*b* of the inner ring 1042. As shown in FIGS. 14 and 15, the ring 1030, which may be an open ring, is secured to the valve stem 906 and sits adjacent to (e.g., engages) the outlet side 1042*b* of the inner ring 1042 and the outlet side 1046*b* of each of the connector portions 1046. The outer portions 1038 extend outwardly (and in this case downwardly) from the outlet side 1046*b* of the connector portions 1046 so that the outer portions 1038 have a height $L_O$, which is greater than the height $L_I$ of the inner ring 1042. While the inlet side 994*a* of the spring seat 994 is flat, the outlet side 994*b* of the spring seat 994*b* is uneven, as the outlet side 1038*b* of each of the outer portions 1038 is disposed on a different plane than the outlet side 1042*b* of the inner ring 1042. As such, the outlet sides 1038*b* of the outer portions 1038 are spaced from the outlet side 1042*b* of the inner ring 1042.

In addition to the benefits described above, the first, second, and third spring seats 194, 394, 594, 794, and 994 of the present disclosure may allow for improved efficiency, added stability, and/or extended component life of the internal valve assembly 100. The flow apertures 210, 410, 610, and 1010 formed in, or at least partially defined by, the first, second, and third spring seats 194, 394, 594, and 994 may beneficially reduce the weight of each respective spring seat 194, 394, 594, and 994. Additionally, the flow apertures 210, 410, 610, and 1010 may allow for greater fluid flow through the bleed valve body 118, 918 thereby decreasing the time required for equalizing the pressure differential across the valve 100. The plurality of flow apertures 210, 410, 610, and 1010 may also counteract, reduce, and/or eliminate high-frequency instability often created by higher flow rates through the valve 100. The flow apertures 210, 410, 610, and 1010 formed in each spring seat 194, 394, 594, and 994 may be made larger due to the greater stability afforded by the corresponding outer portions 238, 438, 638, 838, 1038 and/or increased thickness of the spring seats 194, 394, 594, 794, and 994. By adjusting the size of the relevant flow areas, flow may be manipulated or routed around or through the relevant apertures and orifices in order to further reduce, eliminate, or minimize any instability of the valve 100.

Furthermore, the outer portion 238, 438, 638, 838, 1038 of each respective spring seat 194, 394, 594, 794, and 994 may help maintain alignment of the valve stem 106, provide added stability in high pressure environments, and/or minimize galling of the bleed valve body 118. For example, increasing the height $L_O$ of the outer portions 238, 438, 638, 838, 1038 of each spring seat 194, 394, 594, 794, and 994 may provide additional stability of the disc holder portion 176 of the bleed valve body 118 in the system because the height $L_O$ relates to the interface between the spring seat 194, 394, 594, 794, and 994 and the bore 184. The contacting surfaces at the interface between the spring seat 194, 394, 594, 794, and 994 and the bleed valve body 118, 918 may also improve alignment of the valve disc 168, 968 disc holder 176, 976 and valve stem 106, 906. As the poppet valve 102 opens and closes, the outer portions 238, 438, 638, 838, 1038 may limit instances of misalignment of the valve disc 168, 968 relative to the valve stem 106, 976. Further, an increase in overall thickness of the spring seat 194, 394, 594, 794, and 994, such as the distance between the inlet and the outlet sides of the spring seat 194*a* and 194*b*, 394*a* and 394*b*, 594*a* and 594*b*, 794*a* and 794*b*, and 994*a* and 994*b*, respectively, may limit instances of the spring seat buckling. The increased thickness and/or height $L_O$ of the outer portion 238, 438, 638, 838, 1038 of the spring seats may add to system stability by reducing valve disc 168, 968 vibration when the poppet valve 102 is in the open position and wear caused by galling.

The exemplary spring seats 194, 394, 594, 794, and 994 may be manufactured by additive manufacturing, conventional methods, e.g., casting, powder metallurgy, or machining, or a combination of conventional and additive manufacturing methods. The spring seat 194, 394, 594, 794, and 994 may be stainless steel or a variety of suitable materials. The spring seat 194, 394, 594, 794, and 994 may be used in a variety of applications including different internal valve configurations and fluid regulators.

What is claimed is:

1. An internal valve assembly for connection to a fluid container, the internal valve assembly comprising:
   a valve body having an inlet, an outlet, and defining a main flow path between the inlet and the outlet;
   a poppet valve coupled to the valve body and including a valve disc shiftable between an open position where the inlet of the valve body is open and a closed position where the inlet of the valve body is closed;
   a bleed valve including a bleed valve disc and a bleed valve body having a bore, a bleed inlet, a bleed outlet, and defining a bleed flow path between the bleed inlet and the bleed outlet, the bleed valve arranged to open and close the bleed inlet;
   a valve stem slidably disposed in the valve body and operatively coupled to the bleed valve;
   an actuator operatively coupled to the valve stem and operable to shift the valve stem from a first position in which the poppet valve and the bleed valve are both closed, to a second position in which the bleed valve is open, and a third position in which the bleed valve is closed and the poppet valve is open,
   wherein when the valve stem is in the third position, the poppet valve is arranged to shift toward the closed position and the bleed valve is arranged to open in response to a pressure change;

a spring disposed in the bore and positioned to bias the poppet valve to the open position; and a spring seat sized to fit within the bore and coupled to the valve stem, the spring seat including a guide sized to receive the valve stem, the spring seat defining at least a portion of a flow aperture, wherein the flow aperture is disposed in the bleed flow path and permits fluid communication between the bleed inlet and the bleed outlet;

wherein the bleed valve disc is spaced from the valve disc of the poppet valve; and wherein the bleed valve disc is structurally separate and spaced from the spring seat.

2. The internal valve assembly of claim 1, wherein the spring seat includes a body and an outer portion, the body disposed between the guide and the outer portion, and the outer portion disposed adjacent to an inner wall of the bore.

3. The internal valve assembly of claim 2, wherein the body includes a connecting portion connected to the outer portion and partially defining the flow aperture.

4. The internal valve assembly of claim 1, wherein the flow aperture is bound in part by the bore of the bleed valve body.

5. The internal valve assembly of claim 3, wherein the guide is a circular bore and the body includes an inner ring surrounding the guide, and an outer ring surrounding the inner ring, the outer ring connected to the inner ring by the connecting portion, and wherein the flow aperature is disposed between the inner ring and the outer ring and bound in part by the connecting portion.

6. The internal valve assembly of claim 2, wherein the body is arranged to engage the spring.

7. The internal valve assembly of claim 2, wherein the outer portion is arranged to engage the spring.

8. The internal valve assembly of claim 1, wherein the spring seat includes a plurality of flow apertures, and wherein at least one of the plurality of flow apertures is defined by an arcuate cutout.

9. The internal valve assembly of claim 1, wherein the spring seat includes an inlet side and an outlet side, the inlet side facing the bleed inlet and the outlet side facing the bleed outlet; and wherein a first portion of the inlet side is disposed on a first plane and a second portion of the inlet side is disposed on a second plane spaced away from the first plane.

10. The internal valve assembly of claim 9, wherein a third portion of the inlet side is disposed on a third plane different from the first plane and the second plane.

11. The internal valve assembly of claim 1, wherein the spring seat is operable to guide the valve disc along a longitudinal axis of the bore when the valve disc shifts between the open position and the closed position.

12. The internal valve assembly of claim 1, wherein the spring seat includes a groove sized to receive the spring, the groove configure to limit horizontal movement of the spring relative to the valve stem.

13. The internal valve assembly of claim 1, comprising a ring coupled to the valve stem and adjacent to the spring seat, wherein the spring seat is retained between the spring and the ring.

14. The internal valve assembly of claim 1, comprising a different spring disposed in the main flow path and operatively coupled to the valve stem, the different spring arranged to bias the valve stem toward the first position.

15. An internal valve for equalizing a pressure differential, the internal valve comprising:

a valve body having an inlet, an outlet, and defining a main flow path between the inlet and the outlet;

a poppet valve arranged to open and close the inlet of the valve body, the poppet valve including a valve disc shiftable between an open position and a closed position;

a bleed valve including a bleed valve disc and a bleed valve body having a bore, a bleed inlet, a bleed outlet, and defining a bleed flow path between the bleed inlet and the bleed outlet, the bleed valve arranged to open and close the bleed inlet;

a valve stem slidably disposed in the valve body and operatively coupled to the bleed valve, the valve stem shiftable from a first position in which the poppet valve and the bleed valve are both closed, to a second position in which the bleed valve is open and the poppet valve is closed, and a third position in which the poppet valve is open and the bleed valve is closed; and a spring disposed in the bore and positioned to bias the poppet valve to the open position;

wherein when the valve stem is in the third position and responsive to a fluid flow rate through the internal valve being greater than a pre-determined flow limit, the poppet valve is closed and the bleed valve is opened, wherein when the bleed valve is open, the bleed valve disc is disposed outside of the bleed valve body; and a spring seat sized to fit within the bore and coupled to the valve stem, the spring seat including a guide sized to receive the valve stem, the spring seat defining at least a portion of a flow aperture, wherein the flow aperture is disposed in the bleed flow path and permits fluid communication between the bleed inlet and the bleed outlet.

16. The internal valve of claim 15, wherein the spring seat includes a body and an outer portion, the body disposed between the guide and the outer portion, and the outer portion disposed adjacent to an inner wall of the bore of the bleed valve body.

17. The internal valve of claim 16, wherein the flow aperture is bound in part by the inner wall of the bleed valve body.

18. The internal valve of claim 17, wherein the guide is a circular bore and the body includes an inner ring surrounding the guide and an outer ring surrounding the inner ring, the outer ring connected to the inner ring by a connecting portion, and wherein the flow aperture is disposed between the inner ring and the outer ring and bound in part by the connecting portion.

19. The internal valve of claim 16, wherein the body is arranged to engage the spring and the outer portion is arranged to engage the inner wall of the bore of the bleed valve body.

20. The internal valve of claim 15, wherein the spring seat includes a plurality of flow apertures and at least one of the plurality of flow apertures is defined by an arcuate cutout.

21. The internal valve of claim 15, wherein the spring seat is operable to guide the valve disc along a longitudinal axis of the bore when the valve disc shifts between the open position and the closed position.

22. The internal valve of claim 15, comprising a different spring disposed in the main flow path and operatively coupled to the valve stem, the different spring arranged to bias the valve stem toward the first position.

23. The internal valve of claim 15, wherein valve stem is operatively coupled to an actuator, the actuator operable to shift the valve stem from the first position to the second position and the third position.

24. The internal valve of claim 15, wherein the spring seat includes an inlet side and an outlet side, the inlet side facing the bleed inlet and the outlet side facing the bleed outlet; and wherein a first portion of the outlet side is disposed on a first plane and a second portion of the outlet side is disposed on a second plane spaced away from the first plane.

25. An internal valve for equalizing a pressure differential, the internal valve comprising:

a valve body having an inlet, an outlet, and defining a main flow path between the inlet and the outlet;

a poppet valve arranged to open and close the inlet of the valve body, the poppet valve including a valve disc shiftable between an open position and a closed position;

a bleed valve including a bleed valve body having a bore, a bleed inlet, a bleed outlet, and defining a bleed flow path between the bleed inlet and the bleed outlet, the bleed valve arranged to open and close the bleed inlet;

a valve stem slidably disposed in the valve body and operatively coupled to the bleed valve, the valve stem shiftable from a first position in which the poppet valve and the bleed valve are both closed, to a second position in which the bleed valve is open and the poppet valve is closed, and a third position in which the poppet valve is open and the bleed valve is closed; and a spring disposed in the bore and positioned to bias the poppet valve to the open position;

wherein when the valve stem is in the third position and responsive to a fluid flow rate through the internal valve being greater than a pre-determined flow limit, the poppet valve is closed and the bleed valve is opened; and a spring seat sized to fit within the bore and coupled to the valve stem, the spring seat including a guide sized to receive the valve stem, the spring seat defining at least a portion of a flow aperture, wherein the flow aperture is disposed in the bleed flow path and permits fluid communication between the bleed inlet and the bleed outlet;

wherein the spring seat is operable to guide the valve disc along a longitudinal axis of the bore when the valve disc shifts between the open position and the closed position.

* * * * *

UNITED STATES PATENT AND TRADEMARK OFFICE
CERTIFICATE OF CORRECTION

PATENT NO. : 10,641,404 B2
APPLICATION NO. : 15/635708
DATED : May 5, 2020
INVENTOR(S) : FeiFei Ji et al.

Page 1 of 1

It is certified that error appears in the above-identified patent and that said Letters Patent is hereby corrected as shown below:

In the Claims

At Column 15, Line 29, "aperature" should be -- aperture --.

At Column 15, Line 58, "configure" should be -- configured --.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*